United States Patent [19]
Vaughn

[11] Patent Number: 5,078,484
[45] Date of Patent: Jan. 7, 1992

[54] LAPEL PIN EYEGLASS AND PILLBOX ORGANIZATION

[76] Inventor: Martha Vaughn, 5532 Buffalo Ave., Van Nuys, Calif. 91401

[21] Appl. No.: 541,316

[22] Filed: Jun. 21, 1990

[51] Int. Cl.⁵ .................. G02C 11/02; A44C 25/00
[52] U.S. Cl. .................................. 351/51; 351/158; 63/1.1
[58] Field of Search ............ 351/51, 52, 155, 158; 63/1.1, 2, 14.1; 24/3 C

[56] References Cited
U.S. PATENT DOCUMENTS 2,818,621  1/1958  Pretz ............................... 351/155
4,422,306 12/1983  Larson ............................. 63/1.1

Primary Examiner—Paul M. Dzierzynski
Attorney, Agent, or Firm—Leon Gilden

[57] ABSTRACT

Apparatus for securement to a lapel of clothing to camouflage and provide selective support for eyeglass structure thereon as well as masking containment of a container for pills and the like within the organization.

7 Claims, 4 Drawing Sheets

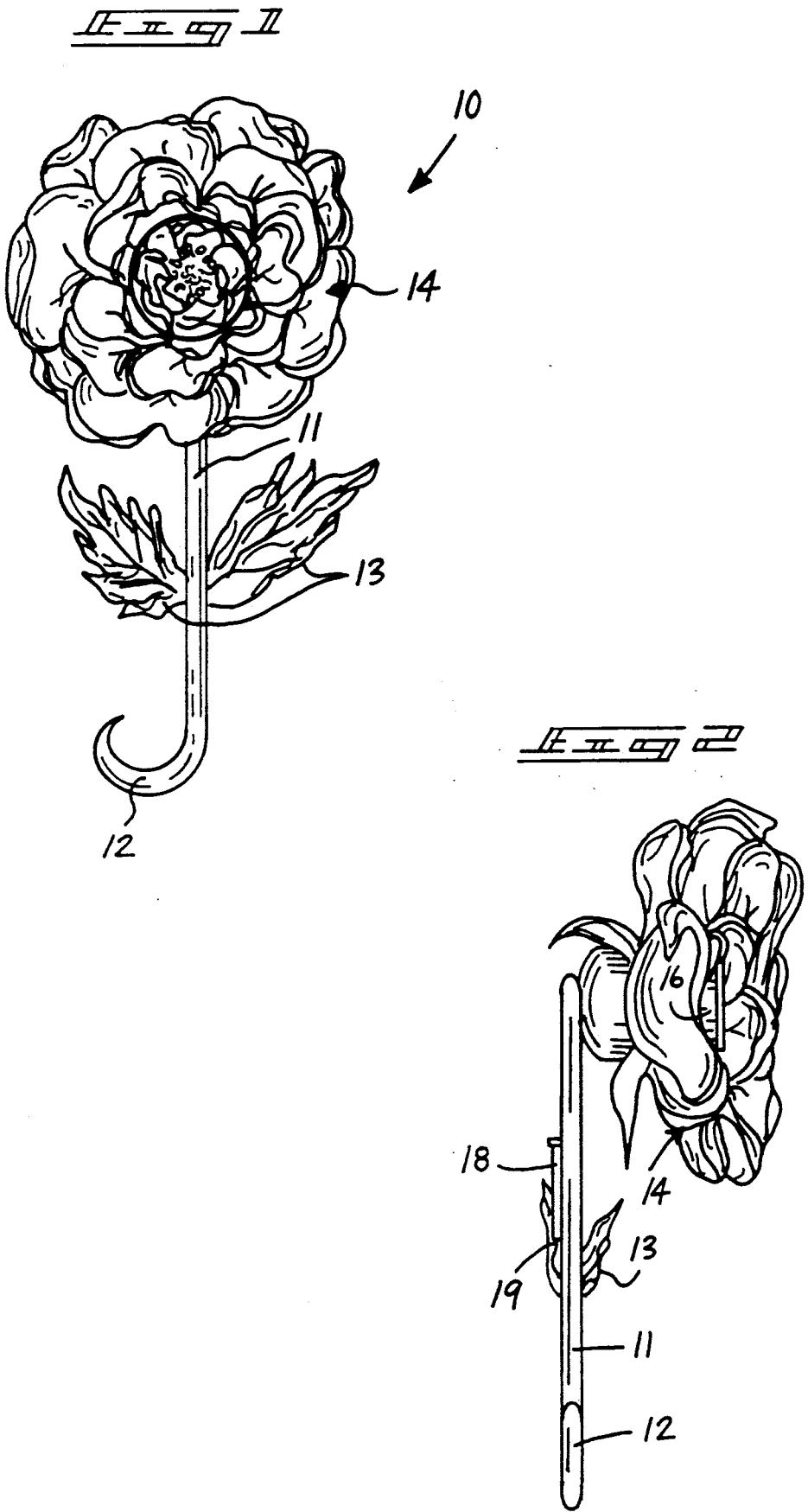

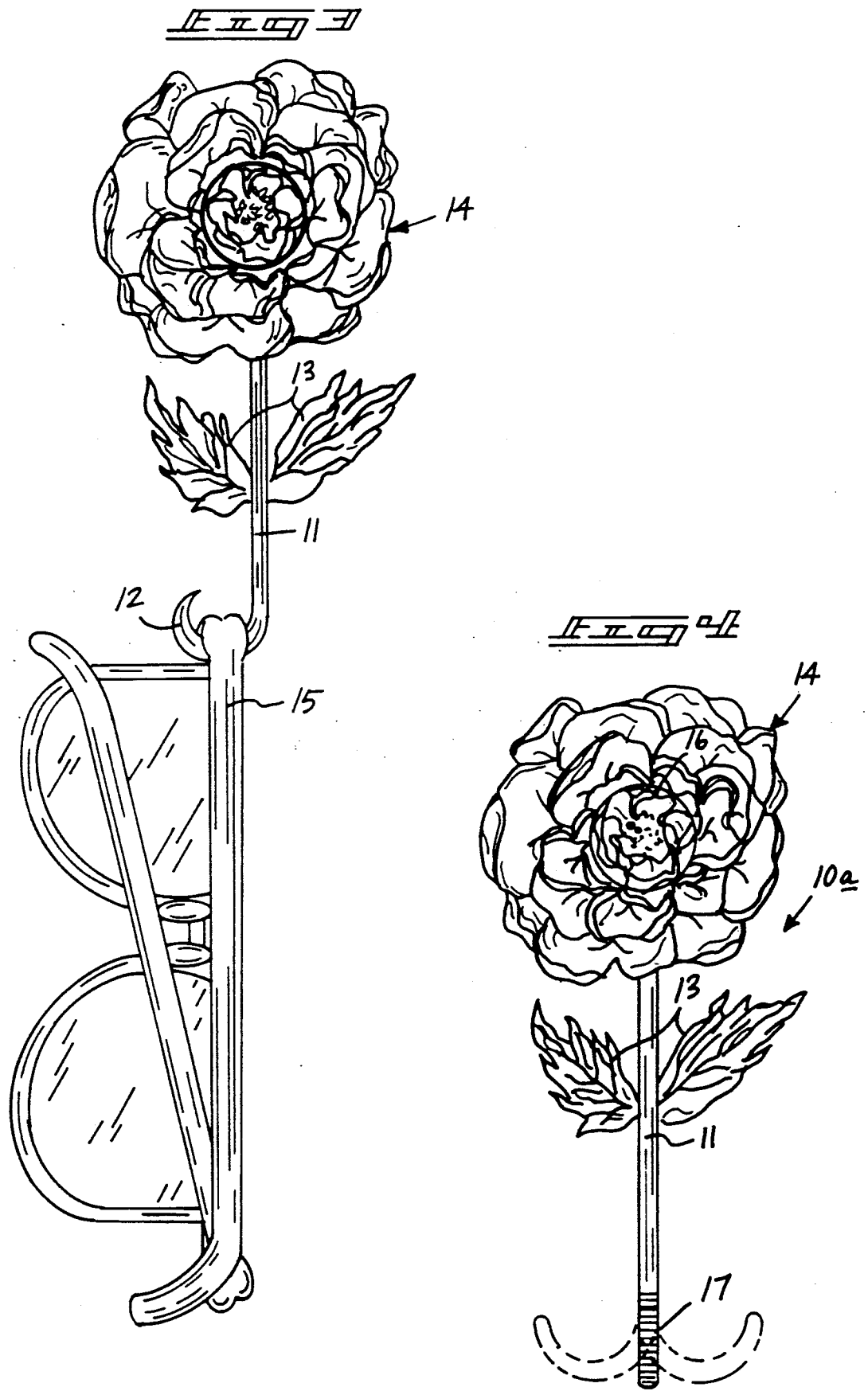

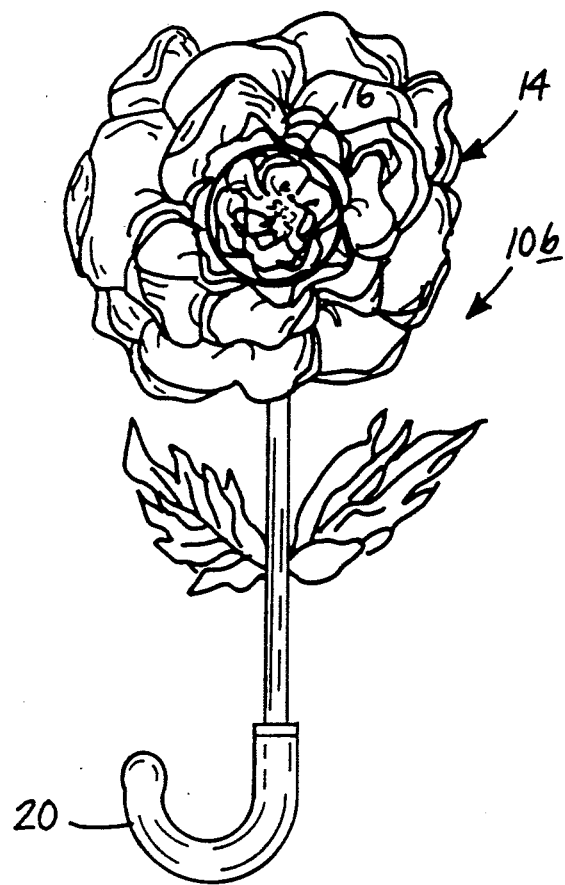
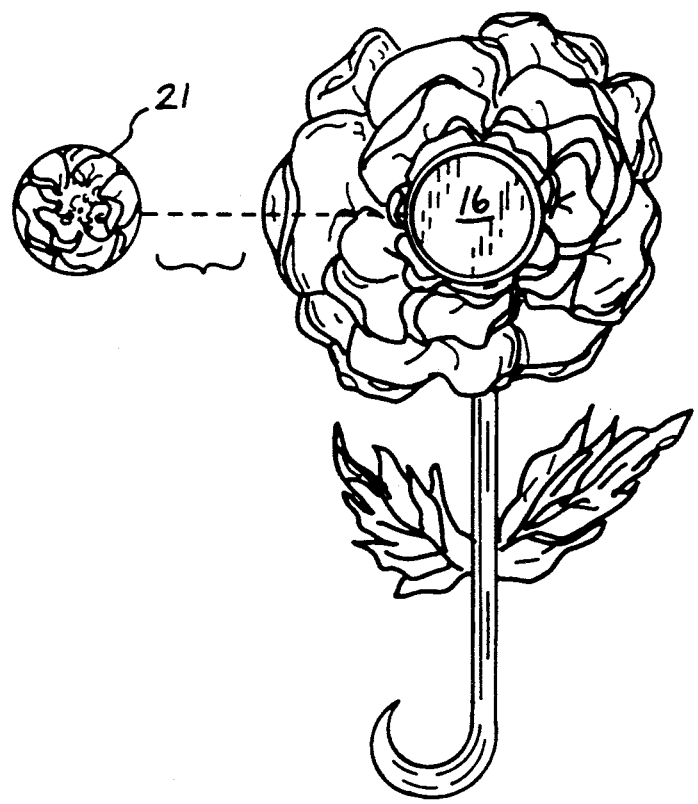

LAPEL PIN EYEGLASS AND PILLBOX ORGANIZATION

BACKGROUND OF THE INVENTION

1. Field of the Invention

The field of the invention relates to eyeglass support structure, and more particularly pertains to a new and improved lapel pin eyeglass and pillbox organization wherein the same permits selective securement of pill members and eyeglass structure to the organization in an organization camouflaged as decorative jewelry.

2. Description of the Prior Art

Clothing, and particularly clothing for use by women frequently lacks in storage and accommodation of contemporary items such as eyeglasses and pills such as vitamins, medicine, and the like. The instant invention attempts to overcome the deficiencies of the prior art by providing a lapel pin structure that camouflages its organization to provide support for eyeglasses and further providing a storage container for containment of pill members and the like therewithin.

Examples of prior art structure for support of eyeglasses may be found in U.S. Pat. No. 2,766,500 to CHANKO wherein a spring clip member is mounted to a tether for suspension of eyeglasses thereon and is typical of the prior art in its clear and unmasked use as a utilitarian clamp as opposed to the instant invention which enhances use of the instant invention by masking its dual purpose as a jewelry type configuration member.

U.S. Pat. No. 2,818,621 to PRETZ sets forth a holder for eyeglasses utilizing a tubular member suspended from a pin structure for suspension of eyeglasses therewithin.

U.S. Pat. No. 2,766,657 to NATHAN sets forth a spectacle organization wherein a temple bar of the spectacle utilizes a clip for securement to hair portion of human anatomy for securement of the spectacles.

U.S. Pat. No. 2,948,500 sets forth a spectacle support structure for display wherein the same utilizes a support stand and mount for supportingly mounting eyeglass structure.

U.S. Pat. No. 3,588,236 to MOLLER provides a spring clip organization for attachment to a frame of an eyeglass member wherein the jaws merely include padded bars but are again typical of prior art organizations limiting their use by individuals in their apparent structural configuration as a clamp.

As such, it may be appreciated that there continues to be a need for a new and improved lapel pin eyeglass and pillbox organization as set forth by the instant invention which camouflages its dual purpose as a support container and eyeglass support structure to encourage utilization by individuals providing a convenient selective storage structure for eyeglasses and associated pill members.

SUMMARY OF THE INVENTION

In view of the foregoing disadvantages inherent in the known types of eyeglass storage apparatus present in the prior art, the present invention provides a new and improved lapel pin eyeglass and pillbox organization wherein the same permits selective utilization of the organization as an eyeglass rack and pillbox container for convenient transport and securement to clothing of individuals. As such, the general purpose of the present invention, which will be described subsequently in greater detail, is to provide a new and improved lapel pin eyeglass and pillbox organization which has all the advantages of the prior art eyeglass storage apparatus and none of the disadvantages.

To attain this, the lapel pin eyeglass and pillbox organization of the instant invention includes apparatus for securement to a lapel of clothing to camouflage and provide selective support for eyeglass structure thereon as well as masking containment of a container for pills and the like within the organization.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved lapel pin eyeglass and pillbox organization which has all the advantages of the prior art eyeglass storage apparatus and none of the disadvantages.

It is another object of the present invention to provide a new and improved lapel pin eyeglass and pillbox organization which may be easily and efficiently manufactured and marketed.

It is a further object of the present invention to provide a new and improved lapel pin eyeglass and pillbox organization which is of a durable and reliable construction.

An even further object of the present invention is to provide a new and improved lapel pin eyeglass and pillbox organization which is susceptible of a low cost of manufacture with regard to both materials and labor, and which accordingly is then susceptible of low prices of sale to the consuming public, thereby making such lapel pin eyeglass and pillbox organizations economically available to the buying public.

Still yet another object of the present invention is to provide a new and improved lapel pin eyeglass and pillbox organization which provides in the apparatuses and methods of the prior art some of the advantages thereof, while simultaneously overcoming some of the disadvantages normally associated therewith.

Still another object of the present invention is to provide a new and improved lapel pin eyeglass and pillbox organization which may be compactly stored when not being utilized.

Yet another object of the present invention is to provide a new and improved lapel pin eyeglass and pillbox organization wherein the same provides selective storage of eyeglasses and pill components in a camouflaged organization for support by individuals on various clothing garments.

These together with other objects of the invention, along with the various features of novelty which characterize the invention, are pointed out with particularly in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an orthographic frontal view taken in elevation of the instant invention.

FIG. 2 is an orthographic side view taken in elevation of the instant invention.

FIG. 3 is an orthographic frontal view of the instant invention in support of an eyeglass structure.

FIG. 4 is a modification of the invention including a flexible hook member mounted thereto.

FIG. 5 is an orthographic frontal view taken in elevation of a further modified organization of the instant invention utilizing a polymeric sheathed hook member.

FIG. 6 is an orthographic frontal view taken in elevation of the instant invention with the pillbox lid removed from the associated storage container.

DESCRIPTION OF THE PREFERRED EMBODIMENT

Figure 7:
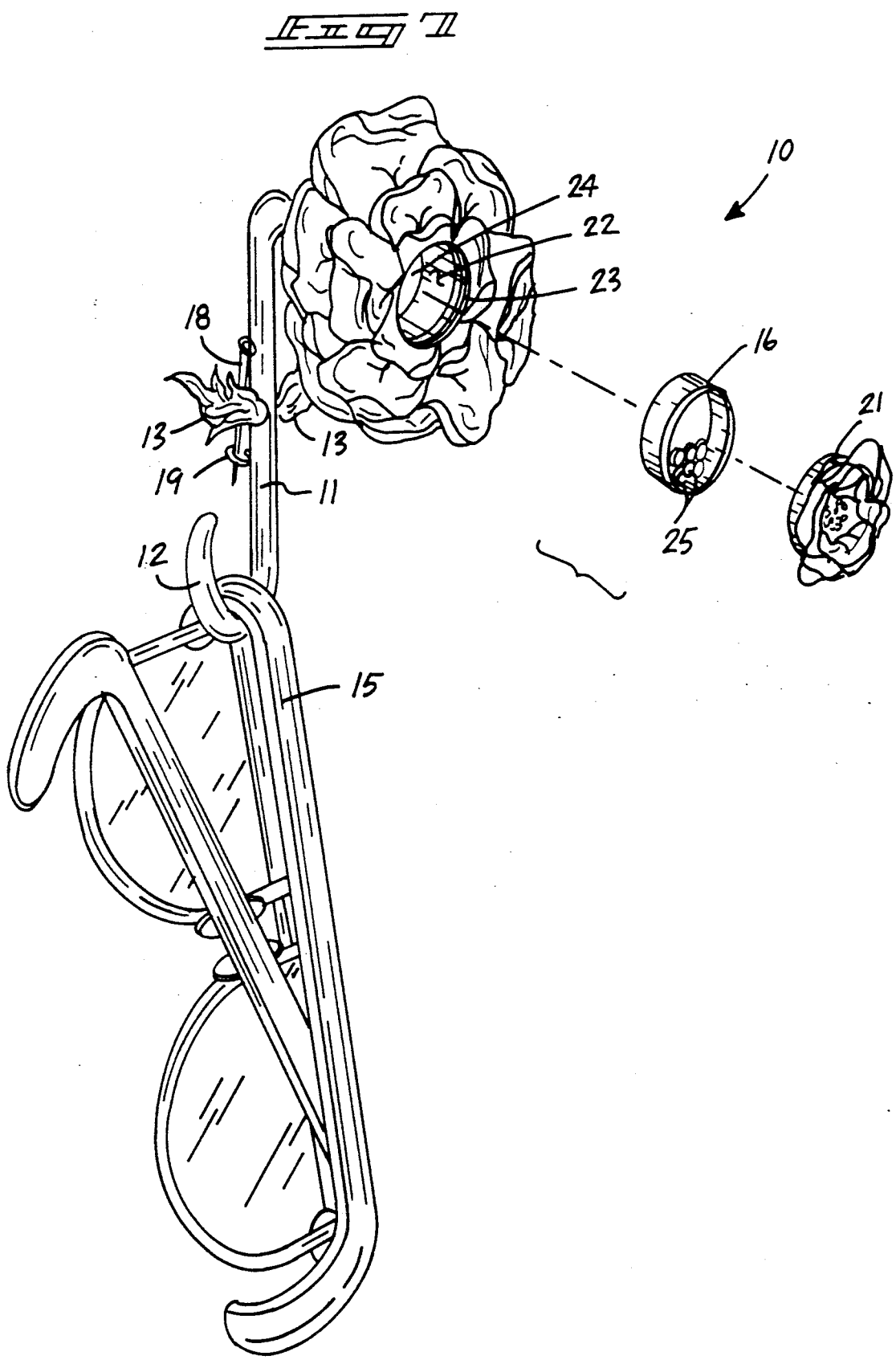
FIG. 7 is an isometric illustration of the instant invention somewhat exploded to illustrate the various components, their configuration, and relationship.

With reference now to the drawings, and in particular to FIGS. 1 to 7 thereof, a new and improved lapel pin eyeglass and pillbox organization embodying the principles and concepts of the present invention and generally designated by the reference numerals 10, 10a and 10b will be described.

More specifically, the lapel pin eyeglass and pillbox organization of the instant invention includes an elongate rigid longitudinally aligned support shaft 11 including a hook member 12 mounted at its lower terminal end wherein it laterally of the shaft 11 underlying a plurality of camouflage leaf members 13 also directed laterally to each side of the shaft 11. A camouflage floral head 14 is mounted integrally to an upper terminal end of the support shaft 11 and directed orthogonally relative to the shaft 11 and the hook member 12 and the leaf members 13.

Reference to FIG. 3 and to FIG. 7 illustrates an eyeglass organization with an eyeglass temple bar 15 mounted about the hook member 12 to permit suspended support of the eyeglass organization as required by individuals. The camouflage floral head 14 includes a central storage container 16 that is oriented orthogonally relative to the shaft 11 and positioned medially of the camouflage floral head 14. Mounted to a rear surface of the support shaft 11 medially of the laterally directed leaf members 13 is a securement pin 18 pivotally mounted separate terminal end to the shaft and selectively secured with a securement pin clasp 19 at its lower terminal end wherein the securement pin clasp is integrally mounted to the support shaft 11. The securement pin 18 is mounted on a diametrically opposed portion of the shaft 11 as to that mounting the floral head 14.

FIG. 4 illustrates a modified organization 10a with a flexible hook member 17 that is manually deformable to accommodate eyeglass bars of various configurations.

Further FIG. 5 illustrates a further modified organization 10b wherein the hook member 20 is laterally directed as in the embodiment of FIGS. 1 to 3 and 7 for example wherein the hook member 20 includes a polymeric sheath in surrounding relationship to the hook member to minimize abrasive wear to an associated eyeglass organization when mounted upon the hook member.

FIG. 9 illustrates the organization in a somewhat exploded view wherein the central storage container 16 is arranged to received a plurality of pill members 25 therewithin and wherein the storage container 16 is receivable in a complementary manner within a cylindrical cavity 22 overlying a cylindrical cavity floor 24 to completely contain the storage container 16 within the camouflage floral head 14. The cylindrical cavity 22 includes a threaded upper end 23 to threadedly receive the complementarily threaded lid 21 to effect selective closure of the container 16 as required.

As to the manner of usage and operation of the instant invention, the same should be apparent from the above disclosure and accordingly no further discussion relative to the manner of useage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A lapel pin eyeglass holder and pillbox organization for selective support of an eyeglass pair, the apparatus comprising, an elongate vertically aligned rigid support shaft, the rigid support shaft including a hook member mounted at a lower terminal end of the support shaft for support of the eyeglass pair, the hook member laterally directed relative to an axis defined by the support shaft, and a camouflage head integrally mounted to an upper terminal end of the support shaft orthogonally oriented to the axis of the support shaft and the hook member, and a storage container coaxially mounted relative to the camouflage head and orthogonally oriented relative to the axis of the support shaft.

2. An organization as set forth in claim 1 wherein the camouflage head includes a cylindrical cavity, the cylindrical cavity including a cavity floor, and the cylindrical cavity complementarily and removably mounting the storage container therewithin.

3. An organization as set forth in claim 2 wherein the cylindrical cavity includes a threaded upper end, and a lid, the lid including external threads cooperative with the threaded uppr end to overly the storage container within the cylindrical cavity.

4. An organization as set forth in claim 3 including a plurality of camouflage leaf members, the leaf members directed laterally relative to the support shaft integrally mounted thereto positioned medially of the camouflage head and the hook member.

5. An organization as set forth in claim 4 including a securement pin hingedly mounted rearwardly of the leaf members and positioned on the support shaft rearwardly of the camouflage head and the leaf members, and the securement pin further including a clasp member, the clasp member mounted to secure a lower terminal end of the securement pin relative to the support shaft.

6. An organization as set forth in claim 5 wherein the hook member includes a polymeric sheath in surrounding relationship relative to the hook member.

7. An organization as set forth in claim 5 wherein the hook member is deformable to permit manual manipulation of the hook member to accommodate various eyeglass organizations.

* * * * *